United States Patent
Prouff et al.

(10) Patent No.: US 8,805,913 B2
(45) Date of Patent: Aug. 12, 2014

(54) METHOD OF EVALUATING A FUNCTION AND ASSOCIATED DEVICE

(75) Inventors: Emmanuel Prouff, Paris (FR); Matthieu Rivain, Paris (FR)

(73) Assignee: Oberthur Technologies, Colombes (FR)

( * ) Notice: Subject to any disclaimer, the term of this patent is extended or adjusted under 35 U.S.C. 154(b) by 554 days.

(21) Appl. No.: 13/116,391

(22) Filed: May 26, 2011

(65) Prior Publication Data

US 2011/0295918 A1   Dec. 1, 2011

(30) Foreign Application Priority Data

May 26, 2010 (FR) .................................... 10 02212

(51) Int. Cl.
*G06F 7/72* (2006.01)
(52) U.S. Cl.
USPC .......................................................... 708/492
(58) Field of Classification Search
None
See application file for complete search history.

(56) References Cited

U.S. PATENT DOCUMENTS

| | | | |
|---|---|---|---|
| 2006/0120527 A1 | 6/2006 | Baek | |
| 2011/0293088 A1* | 12/2011 | Prouff et al. | 380/28 |
| 2011/0295918 A1* | 12/2011 | Prouff et al. | 708/250 |
| 2012/0039463 A1* | 2/2012 | Gentry et al. | 380/28 |

FOREIGN PATENT DOCUMENTS

WO     0055756 A1    9/2000

OTHER PUBLICATIONS

Svetla N. et al.: "Secure Hardware Implementation of Non-linear Functions in the presence of Glitches", Dec. 3, 2008, Information Security and Cryptology A ICISC 2008, Springer Berlin Heidelberg, Berlin, Heidelberg pp. 218-234, XP019115797, ISBN: 978-3-642-00729-3, Section 3 and 4, Cited in French Search Report.

Kai S. et al.: "Higher Order Masking of the AES", Jan. 1, 2005, Topics in Cryptology-CT-RSA 2006: The Cryptographers' Track at the RSA Conference 2006, San Jose, CA, USA, Feb. 13-17, 2006; Proceedings;[Lecture Notes in Computer science], Springer, Berlin, DE, pp. 208-225, XP019026783, ISBN: 978-3-540-31033-4, Section 3; figure 8, Cited in French Search Report.

Mun-Kyu et al.: "Efficient Exponentiation in GF (pm) Using the Frobenius Map", Janvier 1, 2006, Computational Science and Its Applications—ICCSA 2006 Lecture Notes in Computer Science;; LNCS, Springer, Berlin, DE, pp. 584-593, XP019032188, ISBN: 978-3-540-34077-5, Section 1 and 4, Cited in French Search Report.

Gordon D. M.: "A Survey of Fast Exponentiation Methods", Journal of Algorithms, Academic Press Inc., Orlando, FL, US, vol. 27, No. 1, Apr. 1, 1998 pp. 129-146, XP000986921, DOI; 10. 1006/JAGM. 1997.0913, Section 4.1, Cited in French Search Report.

(Continued)

*Primary Examiner* — David H Malzahn
(74) *Attorney, Agent, or Firm* — Young & Thompson

(57) ABSTRACT

A method for evaluating a function of a finite field of characteristic p into itself, for an element x of the field, uses an evaluation, for the element x, of a polynomial formed by a plurality of monomials. The evaluation of the polynomial includes the following steps: determining monomials the degree of which is an integer power of the characteristic p by successive raisings of the element x to the power p; and determining monomials the degree of which is different from an integer power of the characteristic p on the basis of the determined monomials, the degree of which is an integer power of the characteristic p, and by at least one multiplication. An evaluating device is also provided.

20 Claims, 1 Drawing Sheet

(56) References Cited

OTHER PUBLICATIONS

Donald E. "Factorization of Polynomials", Oct. 1, 2005, The Art of Computer Programming. vol. 2: Seminumerical Algorithms, Boston, MA, Addison-Wesley, US, pp. 439, 461-466, XP007917142, ISBN: 978-0-201-89684-8, pp. 464, 485, Cited in French Search Report.

French Search Report, dated Feb. 18, 2011, from corresponding French application.
Overill et al., "Data parallel evaluation of univariate polynomials by the Knuth-Eve algorithm", Parallel Computing, 1997, vol. 23, pp. 2115-2127.

* cited by examiner

METHOD OF EVALUATING A FUNCTION AND ASSOCIATED DEVICE

The invention concerns a method for evaluating a function over a finite field and an associated device.

Certain data processing methods (such as for example cryptographic data processing methods such as the AES algorithm) use functions over a finite field. The manipulated data are then considered as elements of the finite field and the function considered therefore enables one item of data (an element of the field) to be transformed into another item of data (another element of the field, resulting from the application to the aforementioned element of the function concerned).

On account of the operation in binary logic of electronic circuits (for example microprocessors) used for the processing, finite fields (or Galois fields) $F_{2^n}$ of characteristic 2 with $2^n$ elements (for example with n=8 when the data are represented by 8-bit bytes) are frequently used. The concern here however is with any finite field, of which the cardinality can necessarily be written in the form $p^n$: p is a prime number known as the characteristic of the field.

The inventors first of all provide for using the property whereby, as explained below, any function over the field may be written as a polynomial of degree $p^n-1$.

In order to obtain a method of processing data within which the evaluation of the function concerned is sufficiently fast, it is therefore necessary to optimize the computations for evaluating the polynomial associated with the function concerned.

Work has already been carried out on this subject, such as for example the report "*Analyse et implantation d'algorithmes rapides pour l'évaluation polynomiale sur les nombres flottants*", by G. Revy, Laboratoire de l'Informatique du Parallélisme, ENS Lyon, 2006.

In this context, the invention provides a method of evaluating a function of a finite field of characteristic p (p typically being an integer prime number greater than or equal to 2) into itself, for an element x of the field, characterized in that it comprises an evaluation, for said element x, of a polynomial formed from a plurality of monomials and in that the evaluation of the polynomial comprises the following steps:
- determining monomials the degree of which is an integer power of the characteristic p by means of successive raisings of the element x to the power p;
- determining monomials the degree of which is different from an integer power of the characteristic p on the basis of the determined monomials, the degree of which is an integer power of the characteristic p, and by means of at least one multiplication (typically by one of said determined monomials the degree of which is an integer power of the characteristic p, but also furthermore by the element x itself in order to obtain the monomials of odd degree).

The evaluation of the polynomial is thus based on operations of raising to the power p, which are linear in relation to the addition within a field of characteristic p. To be precise, in such a field: $(a+b)^p = a^p + b^p$.

The monomials which cannot be directly obtained by such operations are determined by multiplications of monomials of the type $x^{p^i}$ which themselves are obtained by such operations; there are thus fewer multiplications.

For example, the step of determining monomials the degree of which is an integer power of the characteristic p uses at least two successive raisings of the element x to the power p so as to determine $x^{p^2}$.

The evaluation of the polynomial includes a process of the type comprising the evaluation of a first polynomial for the element $x^p$, the evaluation of a second polynomial for the element $x^p$, the product of the second evaluated polynomial multiplied by the element x and the sum of said product and of the evaluated first polynomial.

As explained below, use is thus made of the fact that it is possible to write the polynomial f(x) in the form of a sum comprising at least the terms $P_1(x^p) \oplus P_2(x^p) \otimes x$. To be precise, it is possible to write:

$$f(x) = P_1(x^p) \oplus P_2(x^p) \otimes x \oplus \ldots \oplus P_p(x^p) \otimes x^{p-1}.$$

The evaluation of the first polynomial (as well as, possibly, that of the second polynomial) may also be implemented by a process of said type. As a matter of fact, the first polynomial $P_1(X)$ may be written as a sum comprising $P_{11}(X^p) \oplus P_{12}(X^p) \otimes X$.

It is thus possible to process each polynomial to evaluate through recursivity: the evaluation of each polynomial to evaluate may in this case include a process of said type.

The solution provided is advantageous in particular when it is sought to minimize the number of non-linear operations with respect to the addition. This is the case in particular when the data to process are manipulated in masked form.

Indeed, in order to avoid malicious persons being able, through the observation of an electronic circuit, to deduce data that is manipulated by that circuit (principally in the field of cryptography), it is known to mask the manipulated data by means of a random value (typically by combination of the data to process and the random value by means of an exclusive or operation, also named XOR) such that the data actually manipulated by the electronic device differ at each execution of the algorithm concerned, even when the attacker purposefully attempts to reproduce the algorithm identically.

The masking operation may correspond to the addition within the finite field considered here.

In order to combat the attacks even more effectively, it has been provided to use several masks to mask the same item of data, typically such that the sum (by means of the XOR operation) of the masked item of data and of the set of the masks enables the original item of data to be retrieved. The original item of data is then in a way represented during the computations by d values (of which d−1 values come from random picking and of which the sum is equal to the original, i.e. not masked, item of data).

In summary it can thus be stated that in this case the element x is represented by d elements $x_i$ of which the sum over the finite field is equal to the element x. One of the elements $x_i$ can thus be considered to be the masked item of data and the (d−1) other elements $x_i$ considered to be the masks used in the context of the masking process.

The processing of such data represented by a plurality of values must be such that the operations applied to those values in the end result in the desired processing for the sum of those values, which does not pose any difficulty when the function to apply is linear with respect to the operation of addition (since it then suffices to apply the desired processing to each of the values representing the item of data in order to obtain the different values representing the result of the operation). As already stated, this is in particular the case for the operation of raising to the power p.

The multiplications provided above are however non-linear. A method is thus furthermore provided for determining a representation of the product of a first element and of a second element (in the aforementioned finite set, typically with cardinality strictly greater than two and in which are defined an addition and a multiplication that is commutative and distributive with respect to that addition), the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d, comprising the following steps:

for each pair formed by a first integer comprised between 1 and d and a second integer strictly greater than the first integer, obtaining a value by means of the following sub-steps:
picking a random value associated with the pair;
performing a first addition of said random value and of the product of the first value associated with the first integer and of the second value associated with the second integer;
performing a second addition of the result of the first addition and of the product of the first value associated with the second integer and of the second value associated with the first integer;
for each integer comprised between 1 and d, determining the value associated with the integer concerned in said representation by summing the product of the first and second values associated with the integer concerned, the random values associated with the pairs of which the first integer is the integer concerned and the values obtained for the pairs of which the second integer is the integer concerned.

It is thus provided to use a multiplication between elements of the set, that is to say between items of data; any function, for example non-linear, on the set may be written in a form using such multiplications as explained later.

The method provided above enables such multiplication to be used between two (d−1)th order masked elements, without compromising the masking used.

It is to be noted that the definition given above provides for associating values with integers comprised between 1 and d (in other words of identifying values with indices varying from 1 to d) whereas the following description uses indexation varying from 0 to d−1. Naturally the indices used in practice are merely parts of one implementation of the invention, which is not limited to a particular indexation. The association of the different values with integers comprised between 1 and d, as provided in the claims, includes any indexation that may be envisaged in practice.

The addition is for example an operation of exclusive or type. Furthermore, the multiplication may be a multiplication of polynomials having binary coefficients followed by a step of reducing by an irreducible polynomial having binary coefficients. As a variant the multiplication may be defined as follows: each non-zero element of the finite set being a given power of a primitive element, the multiplication may then be carried out by an addition of the exponents respectively associated with the powers to multiply, modulo the cardinality of the field less one. If at least one of the elements is zero, the product simply yields zero.

In practice, the product of two elements of the set is for example obtained by reading, from a table stored in memory, an element associated with said two elements.

Being masks, (d−1) values from among the d first values are for example obtained by random picking.

The method provided here is typically implemented by an electronic circuit, for example a microprocessor, with the advantages associated with such implementation; as a variant, it could be an application specific integrated circuit. Said element, the first element and the second element are typically items of data each coded over a plurality of bits and manipulated by the microprocessor.

The set may be a Galois field $F_2^n$, with n greater than or equal to 1, typically n greater than or equal to 2, for example equal to 8.

The invention also provides a device for evaluating a function of a finite field of characteristic p into itself, for an element x of the field, with evaluation, for said element x, of a polynomial formed by a plurality of monomials, comprising: means for determining monomials the degree of which is an integer power of the characteristic p by means of successive raisings of the element x to the power p; means for determining monomials the degree of which is different from an integer power of the characteristic p on the basis of the determined monomials, the degree of which is an integer power of the characteristic p, and by means of at least one multiplication.

Said multiplication is for example between a first element and a second element of the finite field, the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d; the device may then comprise:

means for obtaining a value, for each pair formed by a first integer comprised between 1 and d and a second integer strictly greater than the first integer:
by picking a random value associated with the pair;
by performing a first addition of said random value and of the product of the first value associated with the first integer and of the second value associated with the second integer;
by performing a second addition of the result of the first addition and of the product of the first value associated with the second integer and of the second value associated with the first integer;
means for determining, for each integer comprised between 1 and d, the value associated with the integer concerned in said representation by summing the product of the first and second values associated with the integer concerned, the random values associated with the pairs of which the first integer is the integer concerned and the values obtained for the pairs of which the second integer is the integer concerned.

Other features and advantages of the invention will appear in the light of the following description, made with reference to the accompanying drawings in which:

FIG. 1 represents the main components of a device adapted to implement the method provided by the invention;

This device comprises a microprocessor 2 connected (via suitable buses) to a rewritable memory 4 (typically of EEPROM type) and to a random access memory 6.

Figure 1:
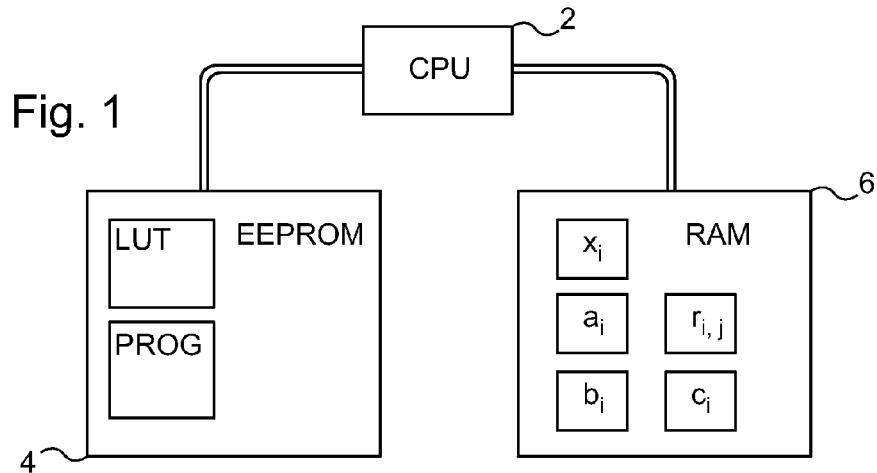
FIG. 1 represents an example of a device capable of implementing the invention.

The device of FIG. 1 is for example a micro-computer. As a variant, it could be another type of electronic device, for example a secure electronic device, such as a microcircuit card.

The rewritable memory 4 contains in particular instructions of a computer program PROG which, when they are executed by the microprocessor 2, enable the implementation of the methods provided by the invention, such as the one described below.

The computer program PROG may as a variant be stored on another data carrier (for example a hard disk), which may possibly be removable (for example an optical disc or a removable memory). In this case, the computer program PROG may possibly be transferred first of all into the random access memory 6 before being executed by the microprocessor 2.

At the time of its execution by the microprocessor 2, the computer program PROG implements a cryptographic data processing method which in particular involves an item of data x to process.

The data to process (in particular the item of data x) are represented within the device of FIG. 1 (and in particular within the random access memory 6) by digital words each formed by several bits; for example a representation of the data is used here in the form of 8-bit bytes.

Figure 2:
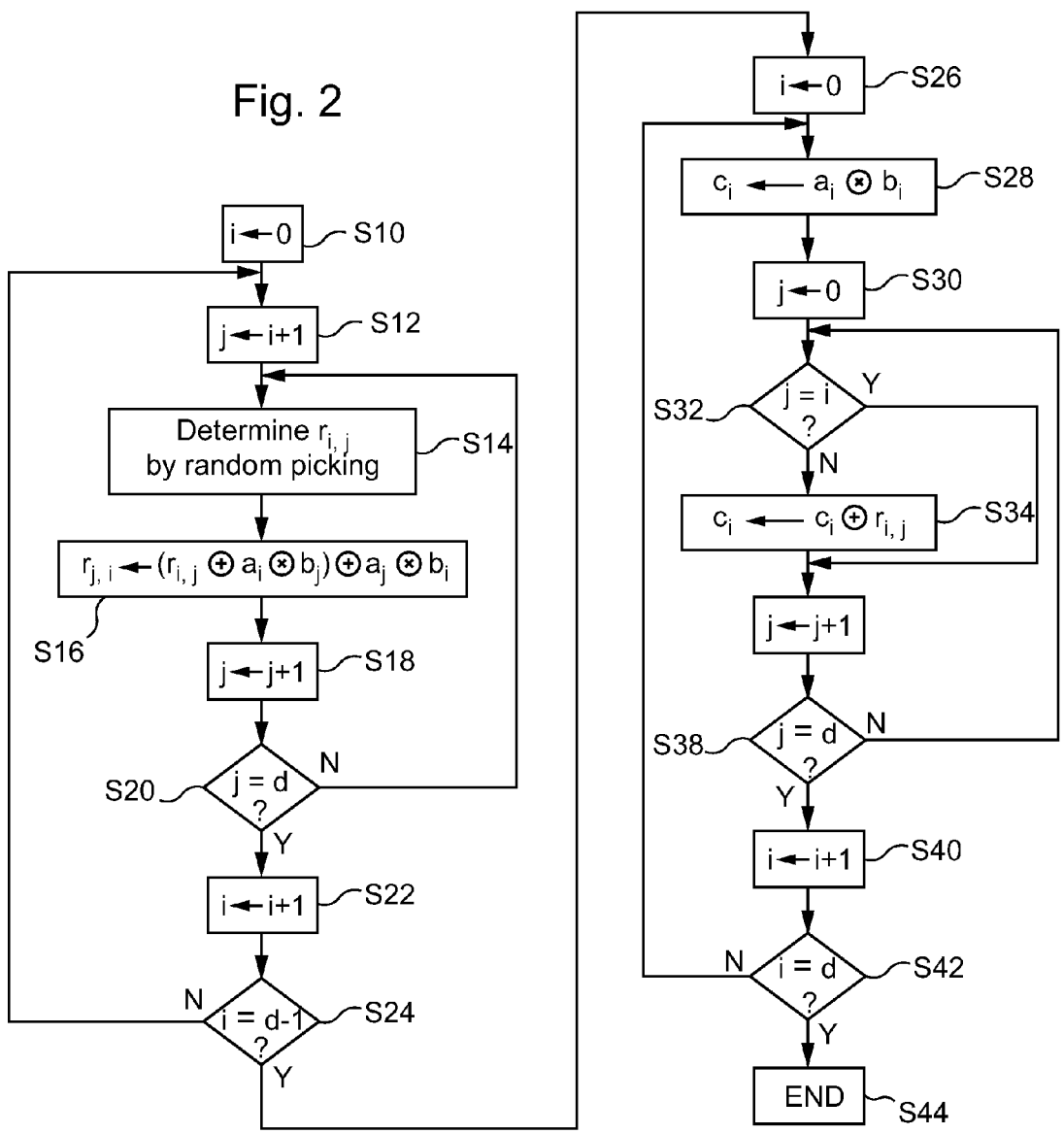
FIG. 2 represents a method implemented by the device of FIG. 1 and which is in accordance with the teachings of the invention.

The random access memory 6 stores the variables and data processed, in particular those manipulated by the method described later with reference to FIG. 2.

In the context of their processing (in particular when cryptographic processing is involved), the data are (each) viewed as elements of a set $F_2^n$ comprising $2^n$ elements and provided with a field structure via the definition of an addition between two elements of the set (denoted $\oplus$ below) and via the definition a multiplication of two elements of the set (denoted $\otimes$).

It can be understood that, in the case described here in which the data are represented by 8-bit bytes, the field $F_2^n$ comprises 256 elements (n=8).

The addition $\oplus$ defined over this field is the "exclusive or" or XOR operation (which is a basic operation in processing by the microprocessor 2).

As regards the multiplication $\otimes$ between two elements (that is to say between two items of data coded over several bits, typically 8 bits), this may be defined as a modular polynomial multiplication, or as the multiplication of two powers of a primitive element (or generator) of the field (in which case, this multiplication amounts to an addition of two exponents of the primitive element modulo $2^n-1$). In this regard, reference may be made to the work "*Finite fields*", volume 20 of the "*Encyclopedia of mathematics and its applications*" by Rudolph Lidl and Harald Niederreiter, Cambridge University Press, $2^{nd}$ edition, 1997.

Whatever the theoretical representation used, the multiplication is implemented here by means of a stored table (stored here in the rewritable memory 4). Such a table, denoted LUT (for "Look-Up Table") stores, for any pair of elements of the field, the result of the multiplication of those elements. As a variant, in the case where the powers of a primitive element are used, recourse may be made to two logarithmic tables.

In this context, the processing of an item of data which achieves the transformation of that item of data into another item of data may be viewed as a function of the field into itself (that is to say a function f which associates with every element x of the field, that is to say with all the possible data, an element f(x) of the field, that is to say the item of data obtained by the processing).

In the device of FIG. 1 a masking technique is furthermore used whereby a determined item of data x is manipulated only in a form masked by one or more masks $x_i$ (i>0), typically determined by random picking at the start of processing (that is to say in practice at the start of the algorithm concerned, which it is wished to protect by the masking). The masks may moreover be regenerated if necessary during the course of processing. This technique is equivalent to the techniques known as secret sharing or multi-party computation often used in cryptography.

The masking used here is successive addition (by application of the XOR operation) of the masks $x_i$ to the item of data x to mask.

Such masking is said to be of higher order when several masks $x_i$ are successively applied to the item of data x.

In this case, the item of data x is as represented while processing by d items of data $x_i$, i.e. the masked item of data $x_0$ and the masks $x_1, x_2, \ldots, x_{d-1}$. (The masks must indeed be stored to be able to retrieve the value x without masking). This is referred to as masking of order (d−1).

The item of data x is thus represented during the processing by d items of data $x_i$ of which the sum (according to the addition $\oplus$ defined over the field referred to above) is equal to the item of data x so represented:

$$x_0 \oplus x_1 \oplus x_2 \oplus \ldots \oplus x_{d-1} = x.$$

As already explained in the introduction, on account of the random picking of the masks at each execution of an algorithm, the masking makes it possible to modify the values manipulated at the time of the different executions of the algorithm and makes it difficult (or impossible) to deduce the data actually processed based on observation of the circuit, with the difficulty increasing with the order of masking.

The masking however involves particular processing when, to the item of data x to be processed (and thus in practice to the data $x_i$ that are actually manipulated), a function f is to be applied that is non-linear with respect to the masking operation (here the addition $\oplus$, performed by an XOR operation). To be precise, contrary to the case of the functions that are linear with respect to that operation, the sum of the results $f(x_i)$ of the application of the function f to the manipulated data $x_i$ is (by the actual definition of the absence of linearity) different from the result f(x) of the application of the function to the item of data x processed.

A method is provided below which, on the basis of the data $x_i$ (where $x_0 \oplus x_1 \oplus x_2 \oplus \ldots \oplus x_{d-1} = x$), enables data $e_i$ to be obtained the sum of which will be equal to f(x) while maintaining the masking of order (d−1) throughout the computation.

It may be noted first of all that the Lagrange interpolation formula makes it possible to define a polynomial p(x) equal to the function f(x) in each element of the set $F_2^n$:

$$p(x) = \bigoplus_{a \in F_2^n} \left[ f(a) \otimes \prod_{b \in F_2^n, b \neq a} \frac{x-b}{a-b} \right],$$

where the multiple product $\Pi$ uses the multiplication $\otimes$ and where $$\frac{x-b}{a-b}$$

is the product (in the sense of the multiplication $\otimes$) of the element (x−b) by the inverse (still in the sense of the multiplication $\otimes$) of the element (a−b). It may be noted that the formula below is written in its general form (with subtraction), but that, in the sets of type $F_2^n$ studied here, the subtraction ("−" symbol above) is also implemented by an XOR operation, denoted here by $\oplus$, on account of the fact that the application of the XOR operation with a given element (that is to say the addition of a given element) is involutary in this type of set.

According to the above, the function f (in particular when it is non-linear with respect to the addition $\oplus$) may be written in the form of a polynomial of degree $2^n-1$ and it is thus possible to define the function f by a family of coefficients $\alpha_i$ such that:

$$f(x) = \bigoplus_{i=0}^{2^n-1} [\alpha_i \otimes x^i],$$

where $x^0$ is the identity element relative to the multiplication $\otimes$, $x^1$ is the element x and, for i>1, $x^i$ is the element x multiplied (i−1) times by itself (by means of the operation $\otimes$).

The processing of an item of data x by the function f may thus be reduced to a combination of additions $\oplus$ and multiplications $\otimes$.

An original method is however provided here for evaluating the polynomial defined above.

By separating the monomials of even degrees and of odd degrees in the above formula (cf. for example J. Eve, "*The Evaluation of Polynomials*", Numerische Mathematik, 6:17-21, 1964), it is possible to write the function f in the form:

$$f(x) = \bigoplus_{j=0}^{2^{n-1}-1} (\alpha_{2j} \cdot x^{2j}) \oplus \left[\bigoplus_{j=0}^{2^{n-1}-1} (\alpha_{2j+1} \cdot x^{2j})\right] \otimes x.$$

In other words, the function f may be written by means of two polynomials $P_1$ and $P_2$ of degree $2^{n-1}-1$ as follows: $f(x)=P_1(x^2)\oplus P_2(x^2)\otimes x$.

By applying the same transformation to each of the polynomials $P_1$ and $P_2$, it is possible to write:

$P_1(x^2)=P_{11}(x^4)\oplus P_{12}(x^4)\otimes x^2$ et $P_2(x^2)=P_{21}(x^4)\oplus P_{22}(x^4)\otimes x^2$, where $P_{11}$, $P_{12}$, $P_{21}$ and $P_{22}$ are polynomials of degree $2^{n-2}-1$.

By using this transformation recursively, the degree of the polynomials considered (and thus of the multiplications to perform to evaluate that polynomial conventionally) is reduced each time, but the number of multiplications by a term of the form $x^{2^i}$ to perform is increased.

If r is the number of such transformations carried out, the degree of the polynomials is $2^{n-r}-1$ and the number of multiplications to carry out not counting the polynomials is $2^r$. An optimum formulation of f is thus obtained for the number of transformations r that minimizes the expression $(2^{n-r-1}+2^r)-2$.

The invention provides for the use of such a formulation to evaluate the function f.

It can be understood that, by virtue of the transformations carried out, evaluation is carried out first of all, just through operations of squaring (or more generally of raising to a power equal to the characteristic of the field) of the monomials the degree of which is an integer power of the characteristic of the field (here monomials of the form $x^{2^i}$).

The other monomials of the polynomial representing the function f (that is to say the monomials of degree different from $p^i$, here $2^i$) are then obtained, after application of a polynomial of the form $P_{jk} \ldots$ to a monomial $x^{p^i}$ determined above, by multiplying by a monomial $x^{p^{i-1}}$ determined above (thus with i>1). As indicated above (cf. the formula using $P_1$ and $P_2$), the monomials of even degree are furthermore obtained by a last multiplication by x.

This evaluation must now be implemented using the polynomial based formulation while maintaining the masking.

The additions are naturally linear with respect to the masking operation (here constituted by the same XOR operation) and the summing of the different elements concerned may thus be carried out by summing the d manipulated items of data representing those elements.

The same applies for the multiplication by each of the coefficients $\alpha_i$, which is also linear with respect to the masking operation, as well as for the squaring operation. To be precise, the fact that the characteristic of the field is equal to 2 (that is to say that the number of elements of the field is of the form $2^n$) gives: $(a\oplus b)^2=a^2\oplus b^2$.

However it is necessary to employ a specific method to determine the result of the multiplications to implement while maintaining the masking of order (d−1) on account of the non-linearity of the operation of multiplication with respect to the masking operation.

The method of multiplying a number a (represented by d values $a_i$) and a number b (represented by d values $b_i$) provided to that end is now described with reference to FIG. 2.

It can be understood that in the context of evaluating the function f described above, which is merely one possible application of that method, the items of data a and b are both equal to the item of data x to process.

The method commences at step S10 by the initialization of a variable i to 0.

At step S12 a variable j is then initialized to the value i+1.

At step S14 a variable $r_{i,j}$ is next determined by random picking, typically using a random value generating function implemented in software form and which forms part of the program PROG.

A variable $r_{j,i}$ is next computed at step S16 using the formula: $(r_{i,j}\oplus a_i \otimes b_j)\oplus a_j \otimes b_i$. It may be noted that the index i is necessarily different from the index j in this formula (since j is initialized to i+1 and incremented as indicated later).

It is to be recalled that, using conventional notation, multiplication takes priority over addition and that the multiplications $a_i \otimes b_j$ and $a_j \otimes b_i$, are thus carried out first, before adding the value $r_{i,j}$ to the result of the first multiplication (using an XOR), and lastly adding to that sum the result of the second multiplication.

It is to be noted that compliance with this order for the operations (in particular for the additions) is imperative if it is wished to maintain the security of the masking.

At step S18 the incrementation of the variable j is next carried out.

It is then tested whether the variable j is equal to d (which as indicated earlier represents the number of values representing a value to process).

In the negative (that is to say if values of j between i+1 and d−1 remain that have not been processed), step S14 is looped back to.

In the affirmative, that is to say when the last passage through step S16 was made with a value of the variable j equal to d-1, the following step S22 is proceeded to.

This step S22 consists in incrementing the variable i.

Next, at step S24, it is tested whether the variable i is equal to (d−1). In the negative, step S12 is looped back to which makes it possible to perform the processing already described with an incremented value of i. In the affirmative, all the values $r_{i,j}$ have been processed (since there are no values $r_{i,i}$ to determine, and thus in particular no value $r_{d-1,\ d-1}$) and the second part of the method is then proceeded to at step S26.

Step S26 consists in initializing the variable i to 0.

Step S28 is next proceeded to at which the product $a_i \otimes b_i$ is computed, which is stored in a variable $c_i$.

Step S30 is then carried out at which the variable j is initialized to 0.

At step S32, equality between the variables i and j is tested.

In the negative, the variable $r_{i,j}$ determined in the first part of the method is added to the variable $c_i$ (by means of the operation ⊕). To be precise, the sum $c_i \oplus r_{i,j}$ is computed, which is again stored in the variable $c_i$ (by overwriting).

In the affirmative at step S32 (that is to say if i=j), step S36 is proceeded to directly (that is to say without performing step S34).

Step S34 is also followed by step S36, at which the variable j is incremented.

At step S38 it is then tested whether the variable j is equal to d. In the negative, step S32 is looped back to. In the affirmative, step S40 is proceeded to.

Step S22 consists in incrementing the variable i.

Step S42 is then proceeded to at which it is tested whether the variable i is equal to d.

In the negative, step S28 is looped back to in order to determine the next variable $c_i$.

In the affirmative, all the variables $c_i$ (for i from 0 to d−1) have been determined and the method is thus terminated (step S44).

The d values $C_i$ so obtained represent the product c, which is the result of the multiplication a⊗b, that is to say that:

$$c = a \otimes b \text{ and } c_0 \oplus c_1 \oplus c_2 \oplus \ldots \oplus c_{d-1} = c.$$

It is to be noted that this last equality may be verified as follows by using the properties of commutativity of the multiplication ⊗, and of distributivity of the multiplication ⊗ with respect to the addition ⊕:

$$\bigoplus_{i=0}^{d-1} c_i = \bigoplus_{i=0}^{d-1} \left[ a_i \otimes b_i \oplus \left( \bigoplus_{j \neq i} r_{i,j} \right) \right]$$

thanks to steps S28 to S34, thus $$\bigoplus_{i=0}^{d-1} c_i = \bigoplus_{i=0}^{d-1} \left[ a_i \otimes b_i \oplus \left( \bigoplus_{j>i} r_{i,j} \right) \oplus \left( \bigoplus_{j<i} (r_{j,i} \oplus a_i \otimes b_j \oplus a_j \otimes b_i) \right) \right]$$

according to S16, hence $$\bigoplus_{i=0}^{d-1} c_i = \bigoplus_{i=0}^{d-1} \left[ a_i \otimes b_i \oplus \left( \bigoplus_{j<i} (a_i \otimes b_j \oplus a_j \otimes b_i) \right) \right]$$

since the $r_{i,j}$ cancel each other, i.e.

$$\bigoplus_{i=0}^{d-1} c_i = \left( \bigoplus_{i=0}^{d-1} a_i \right) \otimes \left( \bigoplus_{i=0}^{d-1} b_i \right) = a \otimes b = c.$$

It has thus been made possible to obtain values representing the product c of the values a and b, while maintaining the masking of order (d−1). The embodiment which has just been described is merely a possible example of implementation of the invention, which is not limited thereto. In particular, the invention is not limited to the case of the field of type $F_2^n$ but also applies in the case of other fields (because, as stated above, the solution relies on the rules of commutativity and distributivity in the field).

The invention claimed is:

1. A method, implemented by an electronic circuit, for evaluating a function of a finite field of characteristic p into itself, for an element x of the field, said element x representing data masked by a masking operation, said function being non-linear with respect to said masking operation, the method comprising:

an evaluation, for said element x, of a polynomial formed by a plurality of monomials, wherein the polynomial is formulated using successive decompositions of a polynomial interpolating said function, thereby reducing the degree of the polynomial used to evaluate the function wherein the evaluation of the polynomial thus formulated comprises the following steps:

evaluating monomials the degree of which is an integer power of the characteristic p by means of successive raisings of the element x to the power p;

obtaining monomials the degree of which is different from an integer power of the characteristic p on the basis of the evaluated monomials, the degree of which is an integer power of the characteristic p, and by means of at least one multiplication of the element x by one of said evaluated monomials the degree of which is an integer power of the characteristic p, wherein said evaluating the function maintains the masking.

2. An evaluating method according to claim 1, wherein the step of evaluating monomials the degree of which is an integer power of the characteristic p uses at least two successive raisings of the element x to the power p so as to evaluate $x^{p^2}$.

3. An evaluating method according to claim 1, implemented in a microprocessor.

4. An evaluating method according to claim 1, wherein the element is an item of data coded over a plurality of bits.

5. The method according to claim 1, wherein each of said successive decompositions comprises writing a current polynomial taken in the element x^pi as a sum of:

a first polynomial taken in the element x^pi+1, and the product of a second polynomial taken in the element x^pi+1 by the element x^pi;

the method further comprising iteratively decomposing said first and second polynomials as a current polynomial.

6. An evaluating method according to claim 1, wherein said multiplication is between a first element and a second element of the finite field, the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d, comprising the following steps:

for each pair formed by a first integer comprised between 1 and d and a second integer strictly greater than the first integer, obtaining a value by means of the following sub-steps:

picking a random value associated with the pair;

performing a first addition of said random value and of the product of the first value associated with the first integer and of the second value associated with the second integer;

performing a second addition of the result of the first addition and of the product of the first value associated with the second integer and of the second value associated with the first integer;

for each integer comprised between 1 and d, determining the value associated with the integer concerned in said representation by summing the product of the first and second values associated with the integer concerned, the random values associated with the pairs of which the first integer is the integer concerned and the values obtained for the pairs of which the second integer is the integer concerned.

7. An evaluating method according to claim 6, wherein the addition over the finite body is an operation of exclusive or type.

8. An evaluating method according to claim 1, wherein the field is a Galois field $F_2{}^n$, with n greater than or equal to 2.

9. An evaluating method according to claim 8, wherein n is equal to 8.

10. An evaluating method according to claim 1, wherein the evaluation of the polynomial includes a process of the type comprising the evaluation of a first polynomial for the element $x^p$, the evaluation of a second polynomial for the element $x^p$, the product of the second evaluated polynomial multiplied by the element x and the sum of said product and of the evaluated first polynomial.

11. An evaluating method according to claim 10, wherein the evaluation of each polynomial to evaluate includes a process of said type.

12. An evaluating method according to claim 10, wherein the evaluation of the first polynomial is implemented by a process of said type.

13. An evaluating method according to claim 12, wherein the evaluation of each polynomial to evaluate includes a process of said type.

14. An evaluating method according to claim 1, wherein the element x is represented by d elements $x_i$ of which the sum over the finite field is equal to the element x.

15. An evaluating method according to claim 14, wherein said multiplication is between a first element and a second element of the finite field, the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d, comprising the following steps:
for each pair formed by a first integer comprised between 1 and d and a second integer strictly greater than the first integer, obtaining a value by means of the following sub-steps:
picking a random value associated with the pair;
performing a first addition of said random value and of the product of the first value associated with the first integer and of the second value associated with the second integer;
performing a second addition of the result of the first addition and of the product of the first value associated with the second integer and of the second value associated with the first integer;
for each integer comprised between 1 and d, determining the value associated with the integer concerned in said representation by summing the product of the first and second values associated with the integer concerned, the random values associated with the pairs of which the first integer is the integer concerned and the values obtained for the pairs of which the second integer is the integer concerned.

16. An evaluating method according to claim 14, wherein addition over the finite body is an operation of exclusive or type.

17. An evaluating method according to claim 14, wherein said multiplication is a multiplication by one of the evaluated monomials the degree of which is an integer power of the characteristic p.

18. An evaluating method according to claim 14, wherein the step of evaluating monomials the degree of which is an integer power of the characteristic p uses at least two successive raisings of the element x to the power p so as to evaluate $x^{p^i}$.

19. A device for evaluating a function of a finite field of characteristic p into itself, for an element x of the field, with evaluation, for said element x, of a polynomial formed by a plurality of monomials,
wherein:
said element x represents data masked by a masking operation,
said function is non-linear with respect to said masking operation, and
the polynomial is formulated using successive decompositions of a polynomial interpolating said function, thereby reducing the degree of the polynomial;
the device comprising:
means for evaluating monomials the degree of which is an integer power of the characteristic p by means of successive raisings of the element x to the power p;
means for obtaining monomials the degree of which is different from an integer power of the characteristic p on the basis of the evaluated monomials, the degree of which is an integer power of the characteristic p, and by means of at least one multiplication of the element x by one of said evaluated monomials the degree of which is an integer power of the characteristic p;
wherein the masking is maintained when the function is evaluated.

20. An evaluating device according to claim 19, wherein said multiplication is between a first element and a second element of the finite field, the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d, the device comprising:
means for obtaining a value, for each pair formed by a first integer comprised between 1 and d and a second integer strictly greater than the first integer:
by picking a random value associated with the pair;
by performing a first addition of said random value and of the product of the first value associated with the first integer and of the second value associated with the second integer;
by performing a second addition of the result of the first addition and of the product of the first value associated with the second integer and of the second value associated with the first integer;
means for determining, for each integer comprised between 1 and d, the value associated with the integer concerned in said representation by summing the product of the first and second values associated with the integer concerned, the random values associated with the pairs of which the first integer is the integer concerned and the values obtained for the pairs of which the second integer is the integer concerned.

\* \* \* \* \*